Jan. 14, 1958 L. R. WHITTINGTON 2,819,573
METHOD AND APPARATUS FOR INFLATING HOLLOW BALLS
OR THE LIKE OF ELASTIC MATERIAL
Filed Sept. 9, 1954 3 Sheets-Sheet 1

INVENTOR.
LLOYD R. WHITTINGTON
BY
William Cleland
ATTORNEY

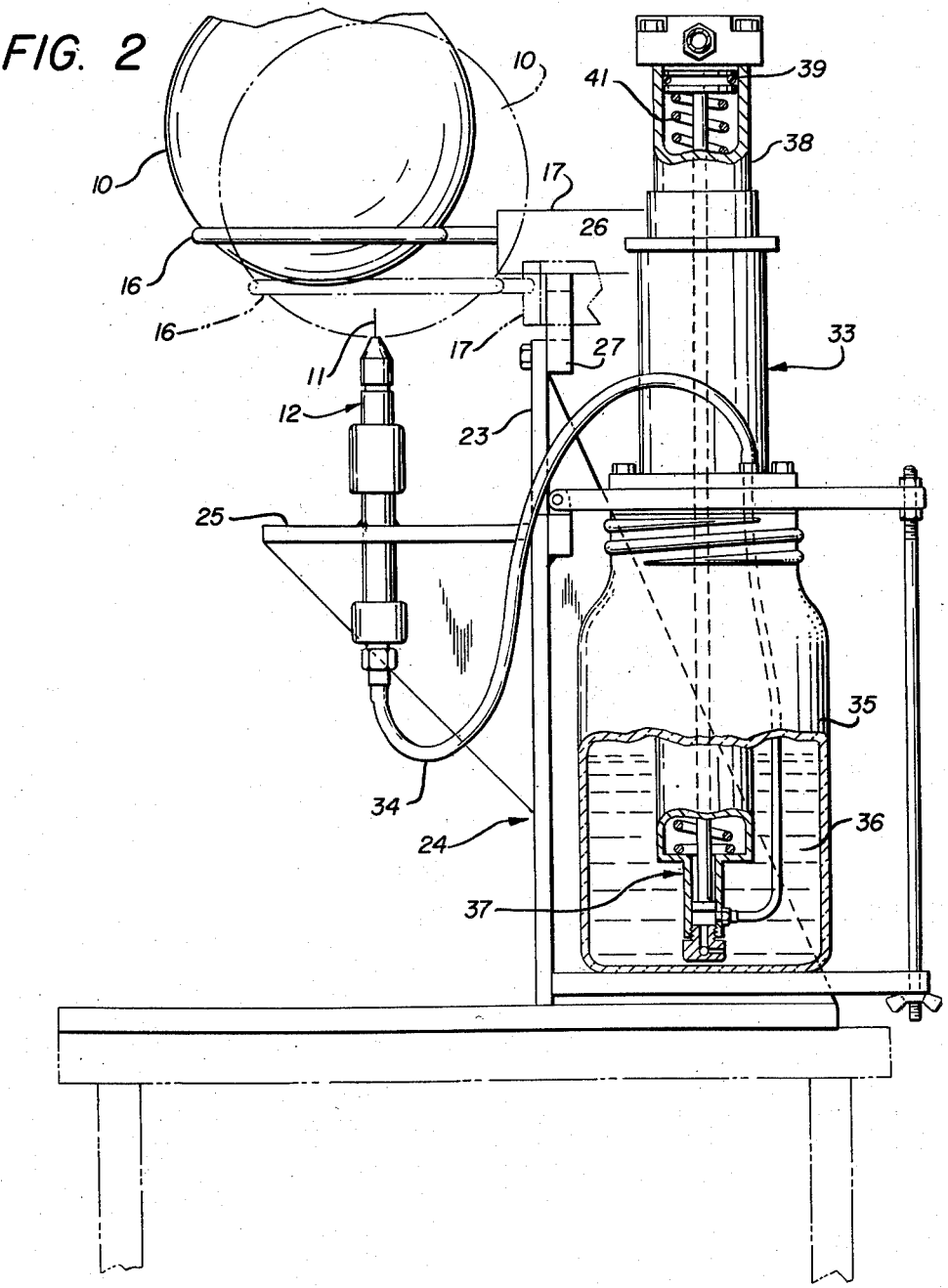

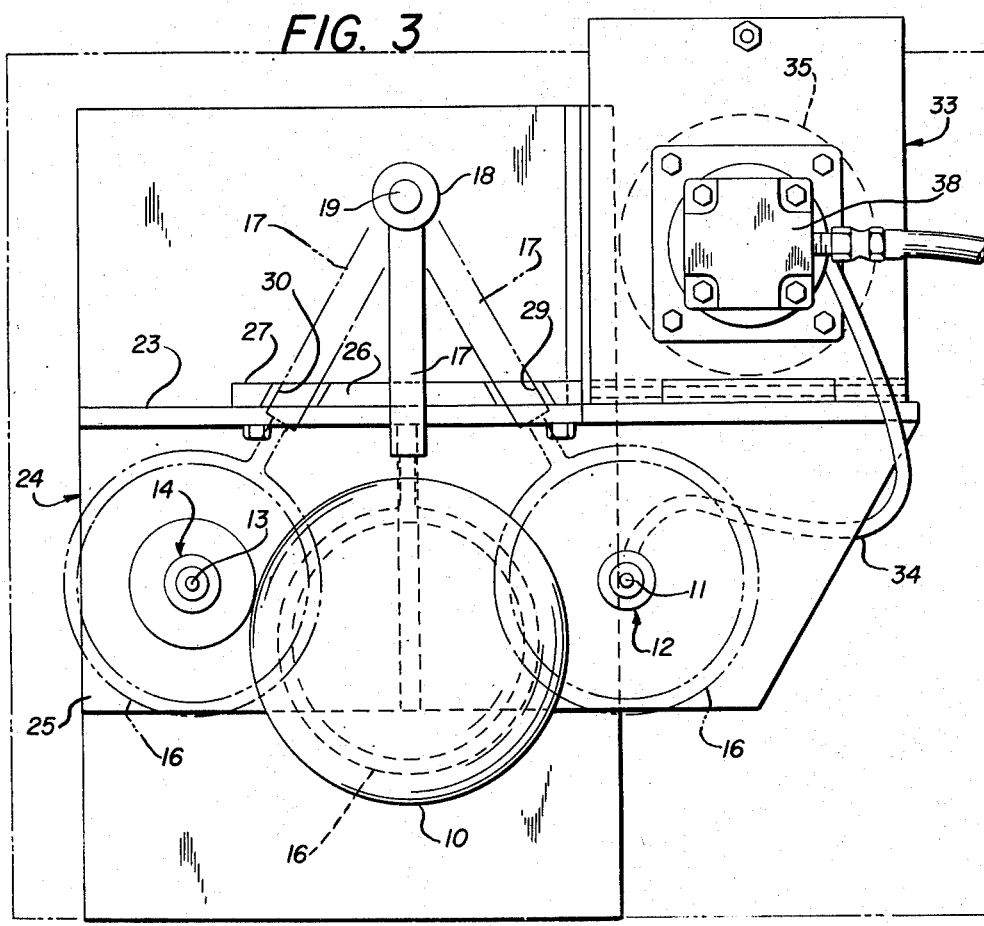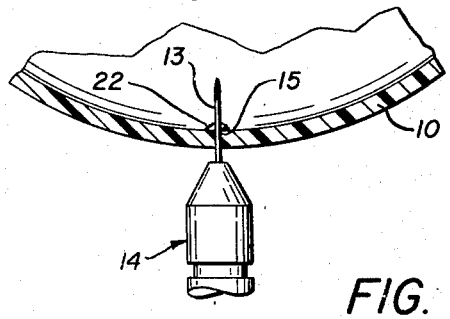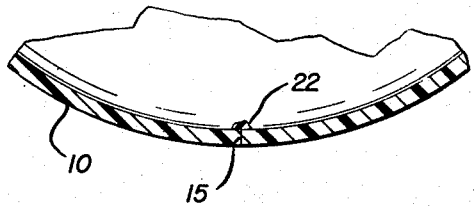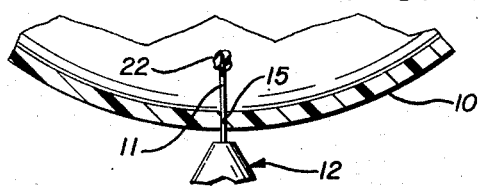

United States Patent Office 2,819,573
Patented Jan. 14, 1958

2,819,573

METHOD AND APPARATUS FOR INFLATING HOLLOW BALLS OR THE LIKE OF ELASTIC MATERIAL

Lloyd R. Whittington, Ashland, Ohio, assignor to The National Latex Products Co., Inc., Ashland, Ohio, a corporation of Ohio Application September 9, 1954, Serial No. 454,978

8 Claims. (Cl. 53—7)

This invention relates to hollow rubber-like articles, and in particular relates to a method and apparatus for inflating balls made of elastic material.

Heretofore, hollow elastic balls, for example, have been inflated by various methods. Rubber balls inflated by conventional use of pills of volatile material during vulcanization thereof did not have uniform internal pressure, and hence there was a wide variance in the bouncing propensities of such balls. Balls inflated by insertion of an inflation needle through rubber slugs, valve stems, or the like on the inner wall surfaces of the balls caused the same to be off-balance and prevented smooth rolling and throwing action. Other methods of ball inflation required use of elaborate equipment or detracted from the outward appearance of the balls.

One object of the invention is to provide a method and apparatus for inflating hollow articles of elastic material, by which balls, for example, will have substantially uniform internal pressure and bouncing propensities.

Another object of the invention is to provide a method and apparatus for inflating hollow articles by which the same may have uniform wall thickness.

Another object of the invention is to provide an improved method and apparatus for inflating hollow elastic balls or like articles utilizing injection needle means, without forming substantially visible needle marks or other blemishes on the outer surfaces of the articles.

Another object of the invention is to provide an improved method and apparatus of the class described wherein cement of relatively high viscosity may be utilized.

Another object of the invention is to provide an improved method and apparatus for inflating inflatable balls or the like, which is particularly adaptable for high production with a minimum of factory rejects due to improper inflation and imperfections.

These and other objects of the invention will be manifest from the following brief description and the accompanying drawings.

Of the accompanying drawings:

Figure 2 is an end elevation thereof, partly broken away and in section, as viewed from the right of Figure 1.

Figure 3 is a top plan view of Figure 1.

Figure 4 is an enlarged fragmentary view of an elastic ball as positioned in the machine for an air-injection step in the method.

Figure 5 is a view similar to Figure 4 showing the same ball as positioned in the machine for another injection step by which an aperture formed by the air-injection step is sealed with cement.

Figure 6 is a view similar to Figures 4 and 5, showing the ball in completed air-sealed condition.

Figure 1:
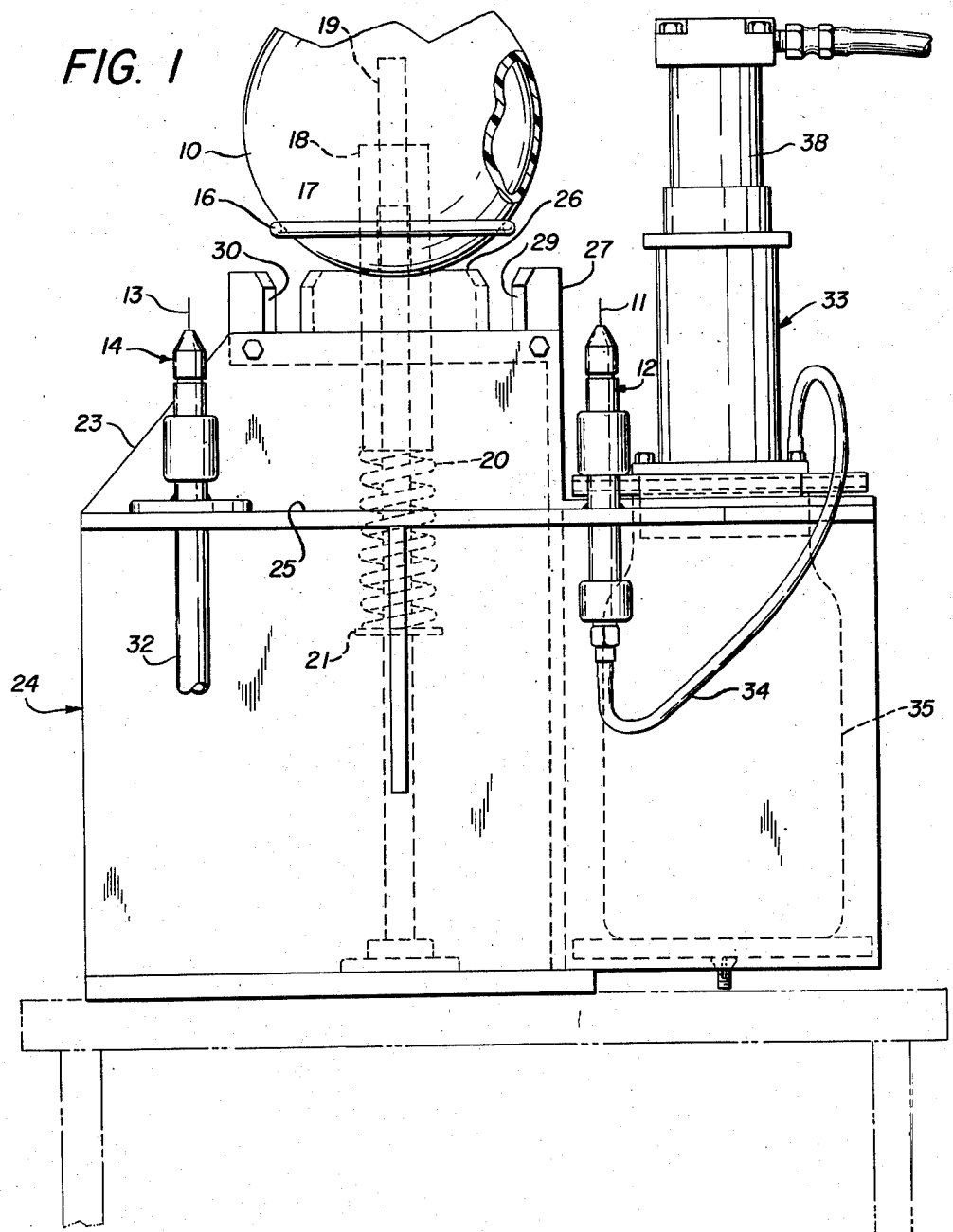
Figure 1 is a front elevation, partly broken away and in section, of a machine for air-inflating hollow inflatable balls, in an inoperative condition.

Referring to the drawings generally, the steps of the method include first providing a hollow inflatable article, such as a thin-walled ball 10, made by conventional molding and curing methods from flexible, elastic, thermoplastic material such as various well-known synthetic plastics, including polyvinyl chloride plastisols, although the same may well be adaptable for use with natural or synthetic rubber articles. Next, the cured ball 10, firmly supported on ball supporting means to be described later, is moved toward and from a positively centered position in which a cement-injecting needle 11 of a predeterminately located, relatively fixed, pressurized cement-injecting device 12 is caused to be injected through the wall of the ball at a fixed point thereon, as shown in Figure 4. The operator may now cause a globule 22 of fluid cement of predetermined size to flow from said needle 11 (see Figure 4), so that upon full withdrawal thereof from the ball, said globule will be deposited on the wall of the ball at the inner end of the aperture 15 formed by needle 11. Ball 10 is then moved and similarly positively centered over a separate, relatively fixed, air-inflation needle 13 of an air-injecting device 14, to project the needle 13 through, or in substantially close proximity to, the aperture 15 made by cement-injecting needle 11 (see Figure 5) and through the deposited globule of cement. Pressurized air, continually passing through needle 13, is then allowed to inflate the ball to predetermined size or inflation pressure, after which the needle 13 is withdrawn. In any event, the cement globule 22, before and after drying on the inner surface of the ball, is completely effective to prevent loss of air through the aperture 15. The continuous flow of air in needle 13 prevents the cement globule from clogging the needle aperture, during insertion and withdrawal of the needle.

Referring now to Figures 1 to 3, there is illustrated a machine which is particularly adaptable for large scale production of balls 10, utilizing the method of the invention. A ball 10 is adapted to be downwardly seated on an annular seating member or ring 16 of substantially smaller inside diameter than the largest diameter of the ball, whereby the ball will have a substantial area thereof projecting freely beneath the ring. For shiftably mounting the ring it may be removably and interchangeably affixed on an arm 17 extending horizontally from a sleeve 18, which is rotatably received on an upright post 19, and yieldingly supported on a compression spring 20, in turn supported on a collar 21 affixed to post 19.

The arm 17 extends over the top of a vertical wall 23 on a frame 24 to present the ring 16 in vertically spaced relation to a horizontal platform 25 extending forwardly from said wall, said arm normally being supported in an inoperative position, shown in Figure 1, by resting upon the upper edge 26 of a vertical guide plate 27, secured to a portion of wall 23 extending above the platform 25. Arm 17, however, is swingable in an arc through the center of the ring, laterally to the left or right of said inoperative position, to angular positions in which said center of the ring (or a ball thereon) is exactly centered over a vertical axis of one or other of the injection needle devices 12 and 14, which may be mounted on platform 25 to extend vertically upwardly therefrom in laterally spaced relation. Vertical guide slots 29 and 30 open downwardly from the upper edge 26 of the guide plate, said slots being adapted, upon depressing the arm 17 against the yielding action of spring 20, to receive the arm in one or other of the slots, thereby to inject needles 11 or 13 of the injection needle devices 12 or 14, respectively, through an exact same point in the wall of the ball or a point in relatively close proximity thereto.

Needle device 14 at the left of the machine, properly termed the air-injection device, is connected to a source (not shown) of pressurized air, through a flexible conduit 32 (see Figure 3), and the needle device 12 at the right of the machine, termed the cement-injection device, is connected to a suitable source 33 of pressurized fluid cement, through a flexible conduit 34 (see Figures 1 to 3). Suitable valve control means (not shown) may be provided for selectively operating the air-injection and cement-injection devices in the ball centering positions described.

The pressurized cement source 33 includes a container 35 of relatively high viscosity liquid cement 36, removably mounted on frame 24 in association with pump means 37 operated by an air-actuated cylinder 38, to force a predeterminately small quantity of cement to injecting device 14, through the conduit 34. A piston 39 of cylinder 38 is returned to an inoperative position, shown in Figure 2, by spring means 41, to draw predetermined quantity of cement 36 from cylinder 35 for a next succeeding cycle of operation.

In operation of the machine of Figures 1 to 3 for a ball inflating cycle of operation, the operator first centers a ball 10 in fully seated position on the ring 16, as shown in Figures 1 and 3. While retaining one hand on top of the ball, he then swings the arm 17 to the right-hand chain-dotted position of Figure 3, and yieldingly urges said arm downwardly into the slot 29 of guide plate 27, thereby moving ball 10 downwardly to project needle 11 of cement-injection device 12 upwardly through the wall of the ball. Prior to or simultaneously with the removal of the needle 11 from the ball, by allowing spring 20 to raise arm 17, the operator may supply fluid cement from the pressurized source 33 thereof, to emit a small globule 22 of cement (see Figure 4) from the end of the cementing needle 11, the globule thereby being deposited on the inner surface of the ball, at the inner end of the aperture 15, thereby to seal said aperture against loss of pressurized air.

Upon removal of needle 11 from ball 10 the arm 17 is swung to the left-hand position, shown in chain-dotted lines in Figure 3, and is again depressed, against the action of spring 20, into left-hand guide slot 30 in guide plate 27, until needle 13 of the air-injecting device 14 is projected through the wall of the ball, which will be precisely through the aperture 15 previously made by needle 11 (see Figure 5) or in substantially close proximity to the same. Pressurized air is allowed to enter the ball through the end of the needle 13, until the ball is inflated to predetermined size or pressure, determined by suitable gauging means (not shown) or by a practiced eye. Upon full inflation being reached the arm 17 is allowed to be raised by spring 20 to remove the needle 13 from the ball.

Thereafter, the arm 17 is returned to its central resting position on edge 26 of guide plate 27, where the ball 10 may be replaced by another ball for a repetition of the above described cycle of operation.

The cement globule 22, being initially in relatively soft condition, prevents loss of air from the ball 10 from the time the air-injection needle 13 is inserted in the ball until removal therefrom. Moreover, even though the globule 22 is relatively small, it is made sufficiently large to seal two side-by-side apertures occasionally made by the needles 11 and 13. If the needles 11 and 13 are inserted in relatively quick succession the two injecting operations may be reversed, in which case the cement will be injected after the ball inflating step of the method.

Thus, it will be readily seen that the apparatus described may be easily operated by one operator to inflate and seal balls in rapid succession, with a minimum of effort and lost motion. The apparatus is adaptable for inflating balls of substantially any size.

Modifications of the invention may be resorted to without departing from the spirit thereof or the scope of the appended claims.

What is claimed is:

1. Apparatus for inflating hollow articles of flexible elastic material, comprising a support, separate inflation and sealing needles relatively fixedly mounted in spaced relation on said support, a member having a seat for receiving a said article thereon, means for mounting said member on said support to be relatively movable to relatively fixed positions in which the respective said needles are axially aligned with a given point on the wall portion of a said article positioned on said seat of the member, means for relatively moving said member with respect to said needles to inject the same individually through the article wall at said given point thereon, means operable for supplying inflating medium to said inflating needle while so injected to inflate the article, and means for supplying a predetermined quantity of sealing medium to said sealing needle to deposit a quantity of sealing medium at the inner end of the apertures formed by the needles.

2. Apparatus for inflating hollow articles of flexible elastic material, comprising a support, separate inflation and sealing needles relatively fixedly mounted in spaced relation on said support, a member having supporting means for receiving a said article thereon with a portion thereof unobstructedly exposed, means for mounting said member on said support to be relatively movable to relatively fixed positions of the member in which the respective said needles are axially aligned with a given point on the exposed wall portion of a said article positioned on said supporting means of the member, means for relatively moving said member with respect to said needles to inject the same individually through the article wall at said given point thereon, means operable for continuously supplying inflating medium to said inflating needle while so injected to inflate the article, and means for supplying a predetermined quantity of sealing medium to said sealing needle.

3. Apparatus for inflating hollow articles of flexible elastic material, comprising a support, separate inflation and sealing needles relatively fixedly mounted in spaced upstanding relation on said support, a member having an opening therethrough defining a peripheral seat for receiving a said hollow article with a wall portion thereof unobstructively exposed through the seat, means for mounting said member to be pivotable on said support in an arc including a given point on said exposed wall portion and intersecting projections of the axes of said needles, indexing means for retaining said member in positions of alignment of said given point on the article wall portion with the axis of one or other of said needles, said mounting means permitting relative movement of said member while in either said position of alignment to inject the respective aligned needle through the article wall at said given point thereon, means for supplying inflating medium to said inflating needle while so injected to inflate the article, and means for supplying a predetermined quantity of sealing medium to said sealing needle.

4. Apparatus for inflating hollow articles of flexible elastic material, comprising a support, inflation and sealing needles relatively fixedly mounted in spaced upstanding relation on said support, a member, an element on said support, an arm pivotally and vertically shiftably mounted on said element, a member attached to said arm to move therewith and having an opening therethrough defining a peripheral seat for receiving a said hollow article with a wall portion thereof unobstructively exposed through the seat, said member swingable with said arm to be pivotable on said support in an arc including a given point on said exposed wall portion and intersecting projections of the axes of said needles, indexing means for retaining said member in positions of alignment of said given point on the article wall portion with either of said needle, said indexing means including guide portions permitting said vertical shifting of said arm and while in either said position of alignment to inject the respective aligned needle through the article wall at said given point thereon, and means for selectively supplying inflating and sealing mediums to said inflating and sealing needles, respectively.

5. Apparatus for inflating hollow articles of flexible elastic material, comprising a support, inflation and sealing needles relatively fixedly mounted in spaced upstanding relation on said support, a member, an element on said support, an arm pivotally and vertically shiftably mounted on said element, a member attached to said arm to move therewith and having an opening therethrough defining a peripheral seat for receiving a said hollow article with a wall portion thereof unobstructively exposed through the seat, said member swingable with said arm to be pivotable on said support in an arc including a given point on said exposed wall portion and intersecting projections of the axes of said needles, indexing means for retaining said member in positions of alignment of said given point on the article wall portion with either said needle, said indexing means including guide portions permitting said vertical shifting of said arm and while in either said position of alignment to inject the respective aligned needle through the article wall at said given point thereon, and means for selectively supplying inflating and sealing mediums to said inflating and sealing needles, respectively, said arm being yieldingly supported against said vertical shifting thereof with respect to said guide portions.

6. A method of inflating a hollow inflatable article of flexible elastic material, comprising the steps of predeterminately locating the article relatively with respect to a cement-injection needle connected to a source of fluid cement, momentarily injecting the cement-injection needle through an outwardly freely exposed portion of the wall of the so located article to deposit a globule of cement on the inner surface of the article at the inner end of an aperture made by the cement-injection needle, predeterminately relocating the article relatively with respect to an air-injection needle connected to a continuous source of pressurized air to have the air-injecting needle in substantially close proximity with respect to said aperture made by said cement-injecting needle, injecting said air-injecting needle through the exposed wall portion of the article while the air is flowing from the needle, and after inflation of the article to predetermined pressure removing the air-injecting needle from the article, said cement globule being adapted to seal the apertures opened by said needles against loss of inflation air from the article, and the continuous flow of air in the air-injecting needle during injection thereof through the exposed wall portion of the article being effective to prevent the cement globule from clogging the usual outlet opening of the needle.

7. A method of inflating a hollow inflatable article of flexible elastic material, comprising the steps of relatively moving the article to have momentarily injected in substantially close proximity to a given point through a freely exposed portion of the wall of the article, first one and then the other of a cement-injection needle connected to a source of fluid cement and a separate air-injection needle connected to a continuous source of pressurized air, the momentary injection of said air-injection needle being sufficient to inflate the article to predetermined size, and said momentarily injected cement-injection needle being regulated to deposit a globule of cement on the inner surface of the article at the inner end of the aperture or apertures opened in said article wall by said injection of the needles, thereby, to seal said aperture or apertures made by the needles against loss of inflation air, a continuous flow of air being provided during said momentary air-injection step to prevent clogging of the air-injection needle with deposited cement.

8. A method of inflating a hollow inflatable article of flexible elastic material, comprising the steps of relatively moving the article with respect to separate air-injection and cement-injection needles connected to sources of pressurized air and fluid cement, respectively, individually to inject said needles in substantially close proximity to a given point through a freely exposed portion of the wall of the article, injection of said air-injection needle being sufficient to inflate the article to predetermined size, and said momentarily injected cement-injection needle being regulated to deposit a globule of cement on the inner surface of the article at the inner end of the aperture or apertures opened in said article wall by said injection of the needles, thereby to seal said aperture or apertures made by the needles against loss of inflation air, a continuous flow of air being provided during said momentary air-injection step to prevent clogging of the air-injection needle with deposited cement.

References Cited in the file of this patent
UNITED STATES PATENTS

| | | |
|---|---|---|
| 575,430 | Savoie | Jan. 19, 1897 |
| 1,159,932 | Green | Nov. 9, 1915 |
| 1,494,709 | Roberts | May 20, 1924 |